Feb. 29, 1944.  J. O. TANKERSLEY  2,342,706
FREEZING FOODSTUFF
Filed Feb. 3, 1943

James O. Tankersley
INVENTOR

BY Arthur L. Davis

ATTORNEY

Patented Feb. 29, 1944

2,342,706

UNITED STATES PATENT OFFICE 2,342,706

FREEZING FOODSTUFF

James O. Tankersley, near Knoxville, Tenn., assignor to Tennessee Valley Authority, a corporation of the United States of America Application February 3, 1943, Serial No. 474,510

4 Claims. (Cl. 62—173)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process for freezing foodstuff and is particularly directed to an improved method for quickly freezing foods in direct contact with a liquid refrigerant.

The principal object of this invention is to provide a method for the high speed freezing of foodstuff wherein the product is ready for use or packaged for future use without further treatment. Another object of this invention is to provide a method for the high-speed freezing of foodstuff which is particularly readily adaptable to change from one variety of foodstuff being frozen to another. A further object of this invention is to provide a method for the high-speed freezing of foodstuff which permits continuous control over the quality of the refrigerant used through the continuous and simultaneous removal of contaminants therefrom. Other objects of this invention include a provision for a method for the high-speed freezing of foodstuff which is adaptable to be incorporated in a portable apparatus.

I have discovered a process for freezing foodstuff by supplying to a rotatable foraminous walled container with foodstuff therein a continuous stream of refrigerant liquid maintained at a temperature below the freezing point of said foodstuff; by removing said refrigerant liquid from said container at a rate at least equal to the rate of supply of said liquid thereto; by maintaining said refrigerant liquid supply until the foodstuff is frozen; by terminating the supply of said refrigerant liquid; and by rotating said container at a speed effective to remove from said foodstuff substantially all of said refrigerant liquid.

Figure 1:
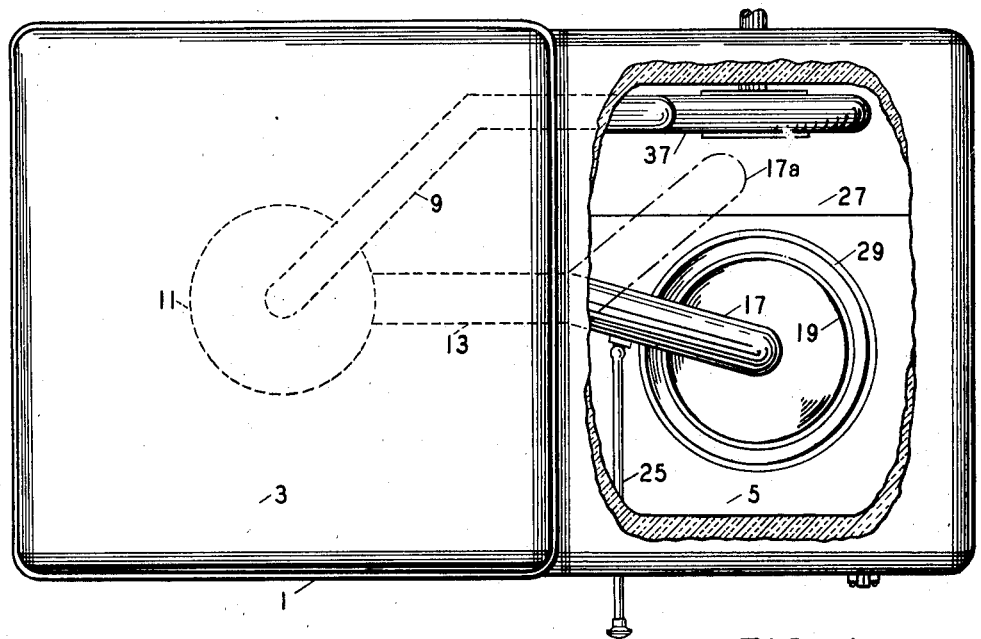

In the accompanying drawing, which forms a part of the specification, and wherein reference symbols refer to like parts wherever they occur, Fig. 1 is a plan view of one form of apparatus for the embodiment of my invention with a portion of the top removed to more clearly show internal construction.

Figure 2:
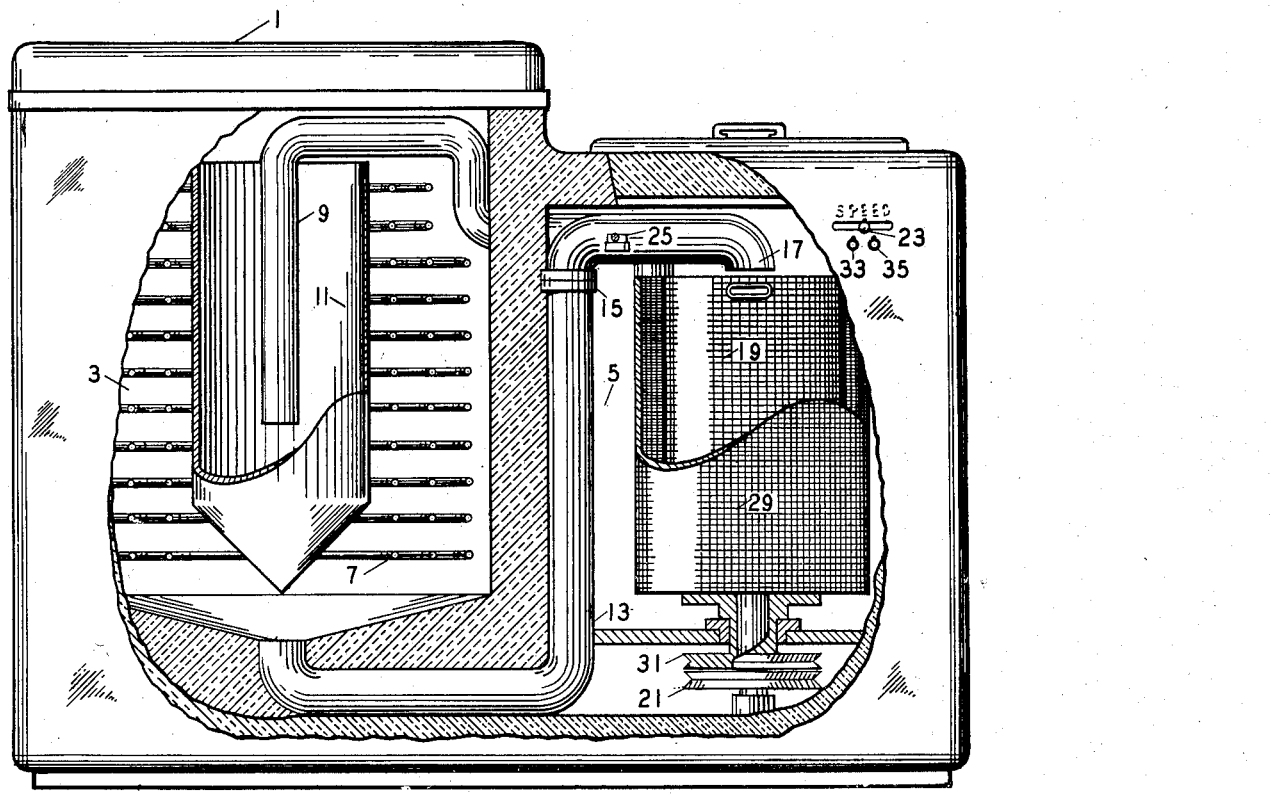

Fig. 2 is an elevational view of Fig. 1 with a portion of the front removed to more clearly show internal construction.

In Fig. 1 and Fig. 2 an insulated vessel 1 has a refrigeration compartment 3 and a freezing compartment 5. The refrigeration compartment 3 is provided with a plurality of evaporator coils, represented by coil 7, which maintains an aqueous refrigerant solution at a predetermined temperature. The aqueous refrigerant solution enters the refrigeration compartment 3 through a pipe 9, from which it is discharged into a baffle 11, so arranged that a maximum transfer of heat is obtained as the refrigerant progresses upwardly to overflow the baffle 11 and descend through the plurality of evaporator coils, represented by evaporator coil 7. The cooled aqueous refrigerant solution is conveyed, due to head differential, from the refrigeration compartment 3 to the freezing compartment 5 through a pipe 13 having a pivotal connection 15, which supports a discharge arm 17. The aqueous refrigerant solution is discharged from the discharge arm 17 into a liquid permeable drum 19 capable of retaining a foodstuff disposed therein and adapted to restrict passage of the liquid refrigerant therethrough to the extent that a predetermined head of liquid is maintained for agitating the foodstuff therein. A driving member 21 (associated driving means not shown) integrally connected to drum 19 imparts rotative movement to the drum 19. A selective speed control 23, associated with the driving means, regulates the rotative movement of the drum 19 to impart thereto a centrifugal force that will properly agitate the foodstuff in the aqueous refrigerant solution during the freezing period. When the foodstuff is frozen the arm 17 is moved to position 17a by an articulated member 25, which is connected thereto, and the arm 17 discharges into a sump 27. The aqueous refrigerant solution flows from the liquid permeable drum 19 leaving only the adherent refrigerant solution, which is then removed by adjusting the selective speed control 23 so that an increased centrifugal force is imparted to the foodstuff, thereby reducing the residual refrigerant to membraneous proportions. The aqueous refrigerant solution flowing from the liquid permeable drum 19 flows into and through a second liquid permeable drum 29 capable of retaining contaminants. A driving member 31

(associated driving means not shown) integrally connected to drum 29 imparts a rotative movement thereto, whereby refrigerant clarification and concentration are accomplished with the aid of centrifugal force. A switch 33 and a switch 35, associated with the driving means, respectively, controls the movement of drum 19 for removal and discharge of the frozen foodstuff and the movement of drum 29 for removal and discharge of the contaminants and ice crystals. The drum 29 runs continuously and is stopped only when the contaminants and ice crystals "clog" the drum so that the refrigerant can no longer pass through the drum and drain into the sump 27. A pump 37 operates continuously drawing refrigerant from the sump 27 and forcing it through the pipe 9, thereby providing continuous circulation of the refrigerant between compartments 3 and 5.

It is evident that there are numerous factors which will influence the most satisfactory operation of my invention, the actual limits of which cannot be established except by a detailed consideration of the characteristics of each particular apparatus and the refrigerant used and the comestible processed therein.

The refrigerant used should be a liquid suitable for direct contact with the particular foodstuff being frozen or the various varieties of foodstuffs that are to be frozen without change of the supply of liquid used. The foraminous receptacle in which the body of refrigerant liquid is maintained and the foodstuff contacted therewith is provided with suitable sized openings depending upon the size of foodstuff frozen, the character of the refrigerant liquid, and the degree of rotation of the receptacle during the treatment of foodstuff. It is preferable to have the refrigerant liquid continuously and simultaneously freed from contaminants so that a minimum amount of attention must be directed to the character of the refrigerant liquid. However, where the foodstuff being frozen is relatively free from contaminants it is not necessary to continuously remove the same. The contaminants may be periodically removed from the liquid through the use of centrifugal force with or without the lowering of the temperature of the liquid to the extent that some ice crystal formation results with the retention of finely-divided solid contaminants therein such as may be desired when using aqueous refrigerant solutions.

In the operation of the process of the present invention, the comestible is frozen in a stream of refrigerant, the movement of which is partially restrained by the characteristics of the container such as to form a body of refrigerant liquid. Most comestibles have a somewhat lower density than the refrigerant liquids with which they come in direct contact for freezing. Consequently, there is a natural tendency for these comestibles to rise towards the surface of this body of liquid after they have been placed therein. In supplying the stream of refrigerant liquid into the top of the container, the position of the stream is adjusted so as to impinge upon the comestible which is normally floating near the surface thereof and cause such comestible to be again submerged, and such motion is repeated in respect to the various units of comestible in the container during the entire freezing operation. The stream of refrigerant liquid so supplied may be a single stream impinging upon the comestibles in the body of liquid in the container, with the action of the impingement upon the comestibles being made particularly effective when the container is rotated during the freezing operation. The stream of refrigerant may be distributed in accordance with a predetermined pattern in order to obtain repeated submergence of the unit of comestible, and such an arrangement is particularly desirable when the container is not rotated during the freezing operation.

The operation of the present process, of course, necessitates the use of suitable apparatus to carry out the respective process steps. For example, the total area of openings required in the foraminous container will depend not only on the characteristics of the refrigerant used but whether or not such container is to remain stationary during the freezing period or will be rotated at an appreciable speed during the freezing operation. When the rotation of the container is at a relatively low speed, the same area of openings may be used either for rotation of the container or for the container remaining stationary during the freezing operation. An example of the use of a container with openings of satisfactory areas for both stationary and rotating operation during freezing is given as follows: A stream of refrigerant liquid was admitted to a stationary container and so adjusted that the top of the body of liquid therein was maintained at a constant level with refrigerant liquid passing continuously through the solution of the container. Strawberries were admitted thereto and after impingement of the refrigerant liquid stream thereon for six minutes, the berries were completely frozen. The container containing a similar charge of berries, wherein the body of liquid was maintained at the same initial height, was then rotated at approximately 15 R. P. M. with the stream of refrigerant liquid supplied thereto unchanged. The top of the body of refrigerant liquid was lowered one to two inches following the effect of centrifugal action in forcing the refrigerant liquid through the wall of the foraminous container.

It will be seen, therefore, that this invention actually may be carried out by the use of various modifications and changes without departing from its spirit or scope.

This application is a continuation-in-part of my application Serial Number 370,284, filed December 16, 1940.

I claim:

1. A method of freezing foodstuff which comprises
    (a) supplying to a rotatable foraminous walled container with foodstuff therein a continuous stream of refrigerant liquid maintained at a temperature below the freezing point of said foodstuff,
    (b) removing said refrigerant liquid through the walls of said container at a rate of at least equal to the rate of supply of said liquid thereto,
    (c) maintaining said refrigerant liquid supply until the foodstuff is frozen,
    (d) terminating the supply of said refrigerant liquid, and
    (e) rotating said container at a speed effective to remove from said foodstuff substantially all of said refrigerant liquid.

2. A method of freezing foodstuff which comprises
    (a) supplying to a rotatable foraminous walled container with foodstuff therein a continuous stream of refrigerant liquid maintained at a temperature below the freezing point of said foodstuff, (b) rotating the container at a speed effective to discharge said refrigerant liquid through the foraminous walls thereof at a rate at least equal to the rate of supply of said liquid thereto, (c) maintaining said refrigerant liquid supply until the foodstuff is frozen, (d) terminating the supply of said refrigerant liquid, and (e) rotating said container at a speed effective to remove from said foodstuff substantially all of said refrigerant liquid.

3. A method of freezing foodstuff which comprises (a) supplying to a rotatable foraminous walled container with foodstuff therein a continuous stream of refrigerant liquid maintained at a temperature below the freezing point of said foodstuff, (b) rotating the container at a speed effective to discharge said refrigerant liquid through the foraminous walls thereof at a rate at least equal to the rate of supply of said liquid thereto, (c) delivering the refrigerant liquid from said container to a rotatable separator for solid contaminants carried by said liquid and concentric with said container, (d) rotating said separator at a speed effective to remove purified refrigerant liquid therefrom at a rate at least equal to the rate of supply of liquid thereto, (e) maintaining said refrigerant liquid supply until the foodstuff is frozen, (f) terminating the supply of said refrigerant liquid, and (g) rotating said container at a speed effective to remove from said foodstuff substantially all of said refrigerant liquid.

4. A method of freezing foodstuff which comprises (a) supplying to a rotatable foraminous walled container with foodstuff therein a continuous stream of refrigerant liquid maintained at a temperature below the freezing point of said foodstuff, (b) removing said refrigerant liquid through the walls of said container at a rate at least equal to the rate of supply of said liquid thereto, (c) delivering the refrigerant liquid from said container to a rotatable separator for solid contaminants carried by said liquid and concentric with said container, (d) rotating said separator at a speed effective to remove purified refrigerant liquid therefrom at a rate at least equal to the rate of supply of liquid thereto, (e) maintaining said refrigerant liquid supply until the foodstuff is frozen, (f) terminating the supply of said refrigerant liquid, and (g) rotating said container at a speed effective to remove from said foodstuff substantially all of said refrigerant liquid.

JAMES O. TANKERSLEY.